C. J. CLEFTON.
COOKER.
APPLICATION FILED AUG. 11, 1919.
1,381,800.
Patented June 14, 1921.
3 SHEETS—SHEET 3.
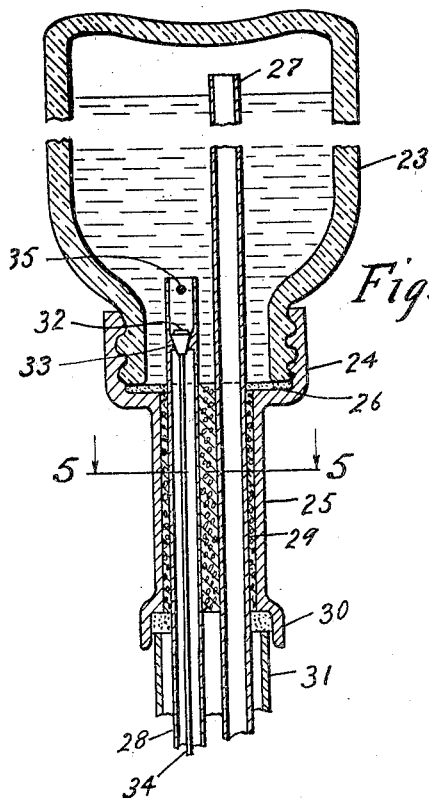
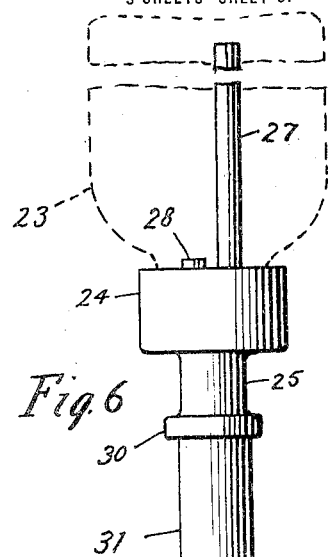
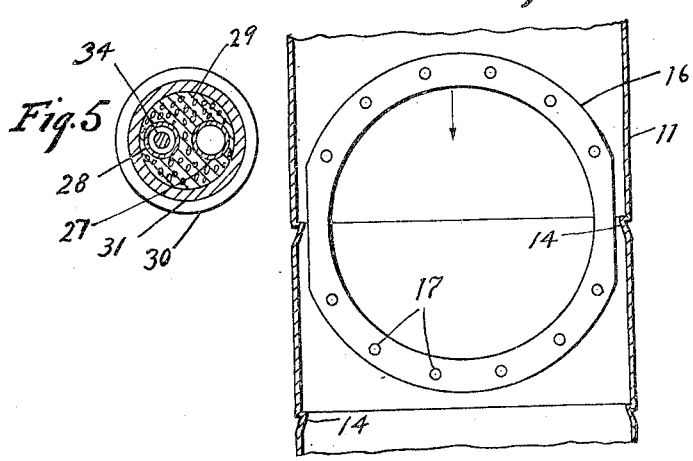
Inventor
Claud J. Clefton
By
his Attorneys.

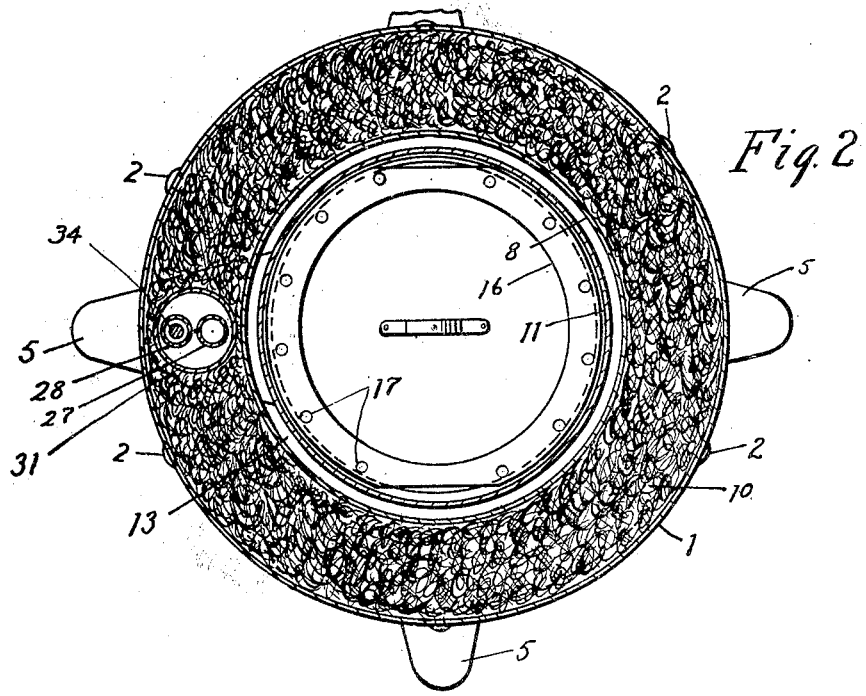
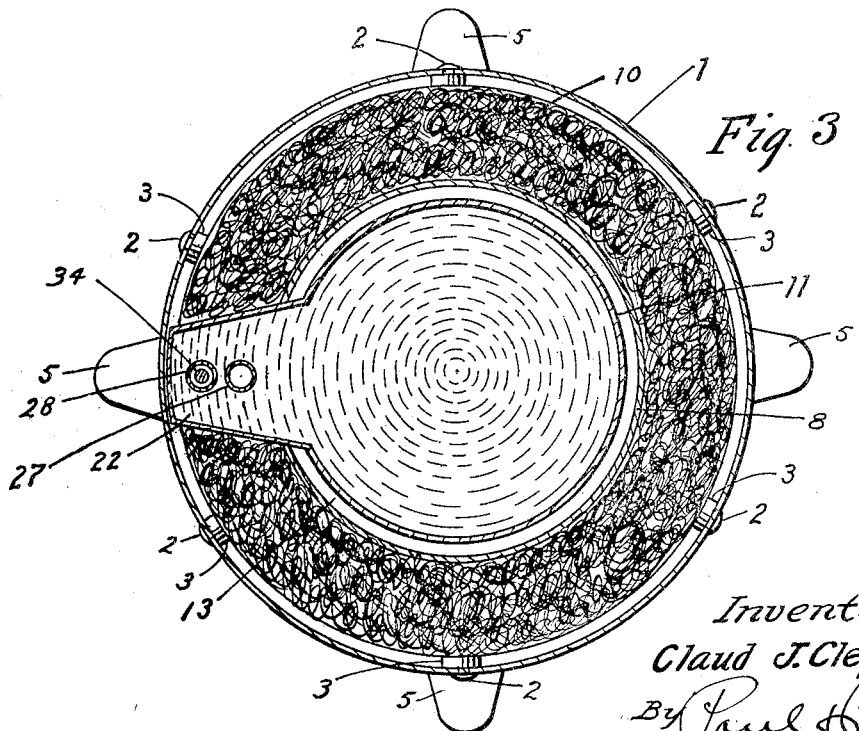

UNITED STATES PATENT OFFICE.

CLAUD J. CLEFTON, OF OWATONNA, MINNESOTA, ASSIGNOR, BY MESNE ASSIGNMENTS, OF ONE-HALF TO GUY J. CLEFTON, OF OWATONNA, MINNESOTA.

COOKER.

1,381,800.   Specification of Letters Patent.   Patented June 14, 1921.

Application filed August 11, 1919. Serial No. 316,705.

*To all whom it may concern:*

Be it known that I, CLAUD J. CLEFTON, a citizen of the United States, resident of Owatonna, Steele county, Minnesota, have invented certain new and useful Improvements in Cookers, of which the following is a specification.

This invention relates to novel improvements in cookers and it more particularly relates to improvements in that type of cooking units in which heat is applied to the cooking compartment through the intermediary of water.

In cooking units of this type it is highly advantageous that the water in the chamber be not allowed to boil dry to the obvious detriment of the cooker and to that of the articles placed therein. This invention obviates such contingency by assuring maintenance of the level of the water in the compartment.

An object, therefore, of this invention, is to provide an improved cooking unit.

A more specific object is to provide such a cooking unit with means to maintain the water by which the cooking is effected, at a substantially constant level.

Other objects of the invention will more fully appear from the following description and the accompanying drawings and will be pointed out in the annexed claims.

In the accompanying drawings,

Fig. 2 is a sectional view on the line 2—2 of Fig. 1;

Fig. 3 is a sectional view on the line 3—3 of Fig. 1;

Fig. 4 is an enlarged sectional detail of the water container and connections;

Fig. 5 is a vertical view on the line 5—5 of Fig. 4;

Fig. 6 is an enlarged view in elevation of the water container connections; and

Fig. 7 is a view showing the manner of inserting a ring support.

Figure 1:
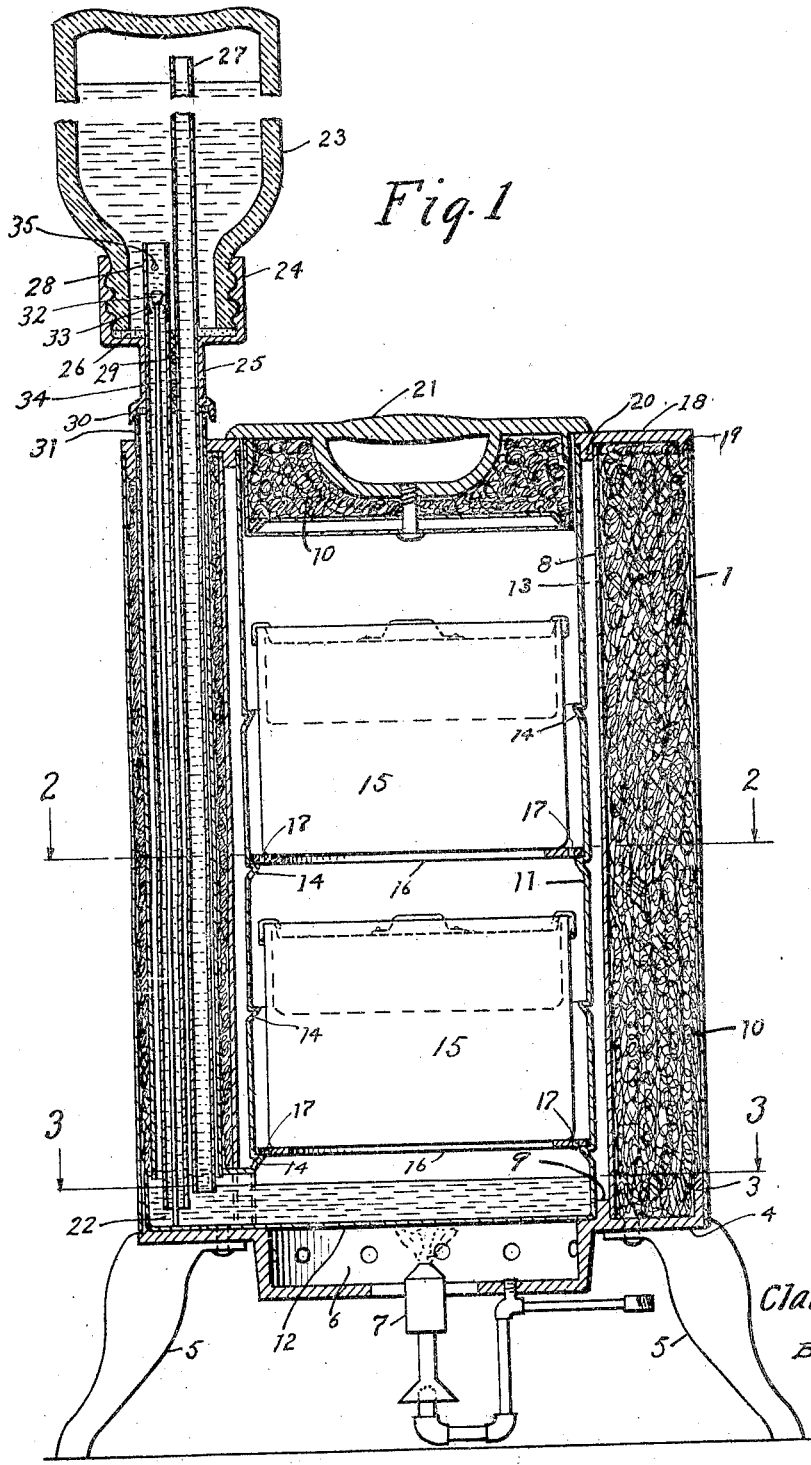
Figure 1 is a vertical sectional view of the cooker.

This novel cooking unit is provided with a preferably substantially cylindrical casing 1, secured by a plurality of bolts 2 to the lugs 3 of the base 4. The base 4 is bolted to the legs 5 by which the unit is supported. The base is provided with a heating chamber 6 adapted to receive heat from any suitable heating element such as an acetylene gas burner 7. A second or inner casing 8 of less diameter is positioned within the casing 1 and is held in position by the substantially annular flange 9 of the base 4. The annular space comprehended between the casings 1 and 8 is preferably filled with an insulating material 10 to insulate against heat radiation.

Within the space defined by the inner casing 8 is positioned the cooking compartment which is preferably formed by a cylindrical member, the annular wall 11 of which is provided with an integral base 12, which rests upon the base 4 and is properly positioned by the inside face of the base flange 9. This cooking compartment is spaced apart from the inner casing 8 and is insulated therefrom by the circumferential air space 13 between the compartment wall 11 and the inner casing 8.

An improved mode of supporting cooking receptacles is afforded by means of members interiorly projecting from the compartment wall 11. Such interiorly projecting means may be afforded by means of a series of punched-in portions, but are preferably made by crimping the wall 11 to form one or more integral ribs, 14.

In the selected embodiment of this invention illustrated in the accompanying drawings there are shown four such annular ribs 14. The receptacles 15, employed in conjunction with this compartment, are of less outside diameter than the diameter of the compartment ribs and hence a receptacle may be lowered past an upper rib to a lower.

A plurality of rings 16 adapted to be positioned upon the supporting ribs are preferably employed to support the receptacles. These rings are preferably narrow, only having a width sufficient to engage the ribs 14 and to support the bottom of the receptacles 15. The rings 16 are preferably provided with a plurality of apertures 17, in order to facilitate the passage of heat from the lower portion of the compartment to the upper when the receptacles 15 are in place. The rings 16 also have opposed cutaway portions, as shown in Fig. 7, in order that any one of them may be easily inserted within the compartment past a rib or ribs and positioned on a lower rib. When turned edgewise so that the opposed reduced portions are presented to the annular ribs they may be easily slipped into position.

The upper portion of the cooking unit is provided with an annular top 18 having two depending annular flanges. The outer flange 19 is adapted to have the upper portion of the casing 1 fitted closely thereagainst. The outer face of the inner flange 20 securely positions the inner casing 8 while the inner face of the annular flange receives thereagainst the upper portion of the cylindrical wall 11 of the cooking compartment. This flange 20 and the base flange 9 define the width of the insulating air space above mentioned. A cover 21 is provided for the compartment and is formed with insulating material 10 in order to reduce the loss of heat.

The lower portion of the substantially cylindrical compartment is formed to present a laterally extending chamber 22, as shown in Fig. 3. The lower portion of the compartment and this communicating chamber are adapted to contain water which is heated by the heating element and the resultant heat communicated to the cooking compartment to cook the food in the receptacles.

To maintain the water at a proper efficient level is the function of the water container and its connections with the chamber and compartment. The preferred construction is to provide a water container such as a water bottle 23, the neck of which is received in threaded engagement in the flange 24 of the collar 25. Packing 26 is inserted between the lip of the bottle and the base of the collar. Two tubes lead from the interior of the water bottle 23. One tube is the air vent 27 and the other is the water-way 28. These two tubes pass through the collar 25 and are preferably embedded therein in a cementitious substance 29. The collar 25 terminates in the annular lip 30 which is adapted to be positioned on the end of the pipe 31, a suitable washer being used to insure a hermetically sealed union. The pipe 31 extends downwardly through the insulation between the inner casing 8 and the casing 1 and enters the chamber 22, formed by the lateral extension of the base portion of the cooking compartment. In order that the water bottle 23 may be inserted after filling and put in position without loss of contents, a valve 32 is adapted to close the water-way by resting on the valve seat 33 interiorly formed in the water-way. A long valve stem 34 extends beyond the end of the water-way and is adapted to contact with the base of the chamber 22, when the water bottle is being positioned. When the water bottle 23 is in normal hermetically sealed position, the end of the valve stem will have been upwardly pushed, the valve 32 unseated, and the water permitted to descend to the chamber and to the communicating compartment.

The vent 27 is of advantage in this initial filling operation, as air from the compartment quickly ascends the empty vent and fills the vacuum tended to be created in the bottle by the descending water past the open valve 32. Due to the length and relatively small diameter of the pipe forming the water-way 28, ascent of air through the water-way is very slow upon unseating of the valve, while by employment of the vent 27 a rapid influx of air into the bottle 23 is permitted. This air ascent and water descent continues rapidly until the compartment becomes filled up to a level substantially at the lower end of the vent 27. Thereafter water will ascend the vent 27 until the level therein is substantially equal to that of the water in the bottle when further water movement ceases until, due to evaporation or steam generation, the compartment water level falls below the lower end of the vent at which time the steam or air ascends the vent to the interior of the bottle 23 thus permitting water descent automatically to replenish the water supply in the compartment.

To refill the water bottle, it is only necessary to withdraw the pipe 31 from the cooking unit, and to reverse the bottle. As the pipe 31 is being withdrawn, the valve 32 drops to its seat 33 and, when the bottle is reversed from its inverted working position to an upright position, the valve 32 drops away from its seat and is caught by the pin 35. The bottle may then be filled through the vent 27 more expeditiously than through the valved water-way 28. Obviously, the collar may be unscrewed from the neck of the bottle if desired.

It is to be understood that the construction disclosed herein is illustrative but not restrictive and that the same may be modified within the meaning and scope of the claims which follow.

Having thus described my invention, what I claim as new and desire to secure by Letters Patent is:

1. A cooking unit having in combination, a cooking compartment, a heating element to heat water in the compartment, a container to hold a supply of water, a water-way connecting the container and compartment, a vent also connecting the container and compartment, said water-way and vent being so arranged as automatically to prevent the water in the compartment from falling below a predetermined level.

2. A cooking unit having in combination a cooking compartment, a heating element to heat the water in the compartment, a hermetically sealed water container above the normal level of water in the compartment, a water-way connecting the container and compartment, and an air vent connecting the container and compartment, the upper end of the vent being above the level of water in the container and its lower end being below the normal level of water in the compartment.

3. A cooking unit having in combination, a casing, a cooking compartment therein, a heating element to heat water in the compartment, a tubular member extending upwardly from the compartment to the casing exterior, a hermetically sealed water container adapted to be carried adjacent the upper end of said member, a water-way and an air vent, each longitudinally extending in said member and connecting the container interior and the compartment, the upper end of the vent being above the level of the water in the container and its lower end being substantially at the normal level of the water in the compartment whereby water passes through the water-way when the lower end of the air vent is uncovered and the automatic maintenance of the normal water level is assured.

4. A cooking unit having, in combination, a casing, a cooking compartment therein, a heating element to heat water in the compartment, a tubular member extending upwardly from the compartment to the casing exterior, a collar adapted to be detachably seated upon the upper end of said member, a water container adapted to be secured to the upper end of said collar, pipes extending through and carried by said collar and adapted, upon assembly of said collar, water container and member, to provide a water-way and an air vent, each connecting the container interior and a compartment, the upper end of the vent being above the level of the water in the container and its lower end being substantially at the normal level of water in the compartment, whereby water passes through the water-way when the lower end of the air vent is uncovered and automatic maintenance of the normal water level is assured.

In witness whereof I have hereunto set my hand this 5th day of August, 1919.

CLAUD J. CLEFTON.

Witnesses:
H. E. CLEFTON,
GUY J. CLEFTON.